Patented Dec. 3, 1929

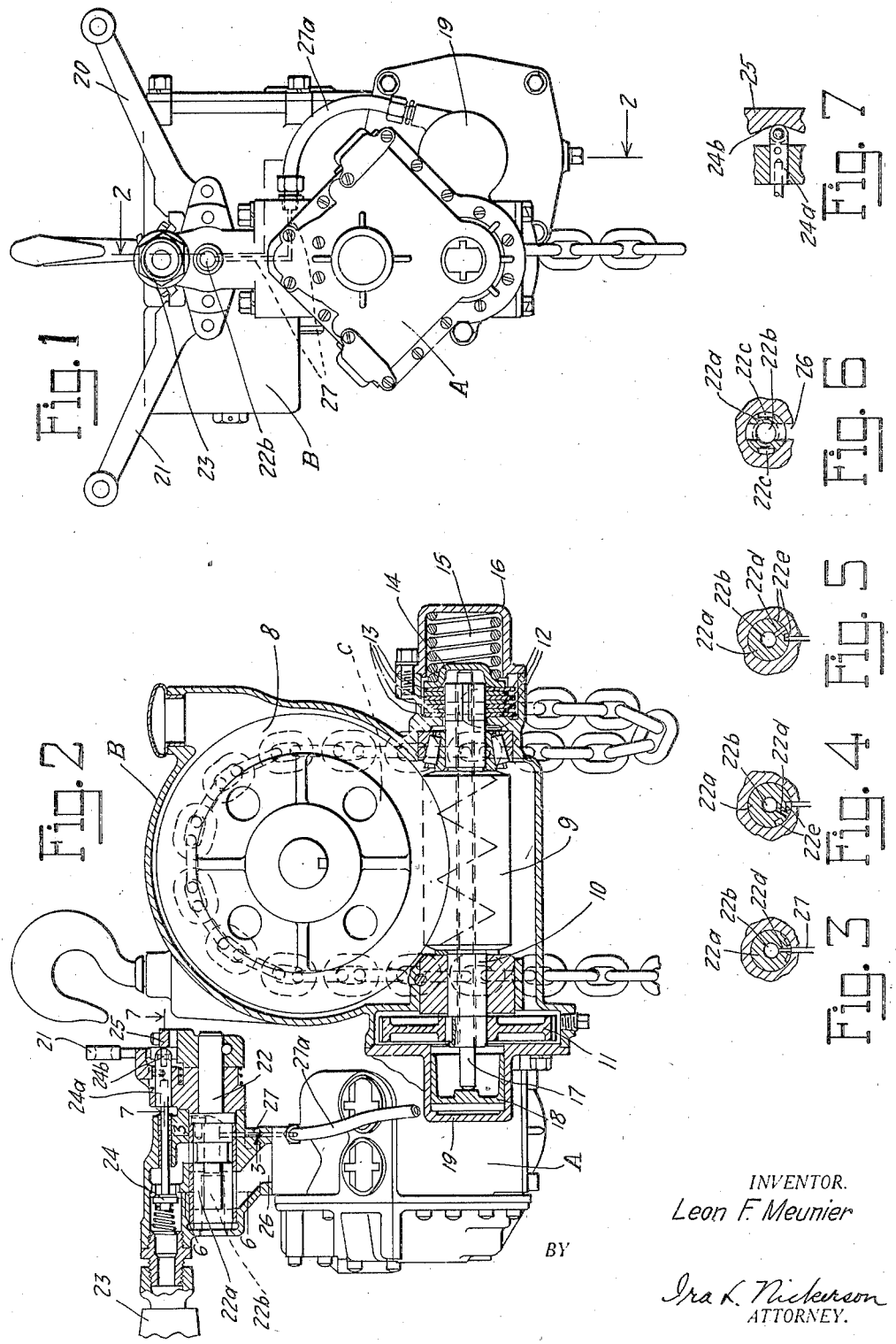

1,738,308

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

BRAKE APPARATUS

Application filed March 8, 1928. Serial No. 259,986.

This invention relates generally to brakes and the control thereof. More particularly it relates to braking systems and apparatus such as used upon power hoists, especially of the fluid pressure type.

One object of the invention is to provide a simple loaded type of brake having a fluid pressure release which will hold its load against creeping and in the event of failure of the fluid supply. Another object is to permit the entire removal of the power or hoisting motor for repair or replacement without disturbing the brake apparatus which continues to hold the load. Still another object is to improve prior apparatus generally in the interest of safety and efficiency.

In order to illustrate the invention one concrete embodiment thereof is shown in the accompanying drawings, in which:

Fig. 1 is an end elevational view;

Fig. 2 is a side elevational view with certain parts shown in section substantially on the broken line 2—2 of Fig. 1;

Fig. 3 is a fragmentary sectional view on the line 3—3 of Fig. 2;

Figs. 4 and 5 are views similar to Fig. 3 but showing the control valve in different positions;

Figs. 6 and 7 are detailed sectional views substantially on the lines 6—6 and 7—7 of Fig. 2.

The embodiment of the invention chosen for the purpose of illustration discloses a power operated hoist of the fluid pressure type arranged to be operated by a motor A secured to a casing B, which encloses the hoisting drum C and the transmission for the latter. The transmission preferably comprises a worm gear 8 on the drum shaft, which gear meshes with a worm 9 carried by a transverse shaft 10 suitably supported in bearings in casing B. The end of shaft 10 adjacent motor A has a gear 11 keyed thereto which is driven by suitable transmitting means including a pinion (not shown) extending from the motor casing.

The braking apparatus for drum C is disposed on the shaft 10 on the end remote from gear 11 and is preferably of the multiple disk or plate type. In the present instance shaft 10 has suitably secured thereto for limited axial movement a series of plates 12 disposed between similar plates 13 mounted on the casing B. A cup-shaped pressure member 14 encloses the end of shaft 10 and receives the thrust of a heavy coil spring 15 enclosed in a cover plate 16 secured to the casing. Spring 15 and pressure plate 14 normally maintain the brake plates 12 and 13 in tight engagement, thus applying braking force to drum C through the transmission which includes the worm gear drive 8, 9.

The releasing apparatus for the brake is arranged at the motor end of the hoisting device and includes a control rod 17 arranged to engage pressure member 14 and force the same to the right against spring 15 thereby to release the brake disks 12 and 13 of the pressure of the spring. By preference the control rod extends axially through the worm shaft 10 which has a central bore for this purpose. Actuation of control rod 17 is effected by a piston 18 supported in a cylinder 19 in line with shaft 10 and disposed to the left and beyond gear 11.

Piston 18 is arranged to be actuated automatically by pressure fluid when motor A is in operation and at all other times to be vented. Hence, admission and venting of motive fluid to cylinder 19 is preferably subject to the control means for motor A. The operating or control lever for the motor has diverging arms 20 and 21 (Fig. 1) and is arranged to rotate a shaft 22 (Fig. 2) carrying the control or distributing valve 22$^a$ shown in transverse section in Fig. 6. Motive fluid is admitted from supply pipe 23 by a throttle valve 24 of the reciprocating type having a guide 24$^a$ with a roller 24$^b$ bearing against a cam plate 25 (Figs. 2 and 7) on the member carrying the diverging arms 20 and 21. Control valve 22 has a central bore 22$^b$ (Figs. 2-6 inclusive) communicating with atmosphere and peripheral recesses 22$^c$ (Fig. 6) for live motive fluid. Thus, when either arm 20 or 21 is pulled down, passage 26 (Figs. 2 and 6) leading to the motor is cut off from atmospheric vent 22$^b$ and connected with either of the live air passages 22$^c$ to operate the motor either to hoist or lower the load.

Pulling down upon arm 20 raises the load, while pulling down upon arm 21 lowers the load.

The portion of control valve 22ª, sectioned along the line 3—3 of Fig. 2, controls the brake. With the control valve in its neutral position, shown in Fig. 3, passage 27 which connects with cylinder 19 through a flexible pipe 27ª is in communication with the exhaust chamber 22ᵇ in the valve through radial port 22ᵈ. When the control valve 22ª is rotated either to the right or to the left, passage 27 is brought into register with one or the other of two live air passages 22ᵉ (Figs. 4 and 5). Thus, when the motor is operated either to raise or lower the load, motive fluid passes through connection 27, 27ª to cylinder 19 acting upon piston 18 to move control rod 17 to the right thereby to release the brake disk of the pressure of spring 15.

In the construction disclosed it is to be noted that the control means for the brake are disposed at opposite ends of the hollow shaft 10 which carries worm 9, the fluid pressure releasing means comprising piston 18 and cylinder 19 being adjacent motor A. By utilizing flexible pipe 27ª for the connection to cylinder 19, provision is made for removing the entire motor casing A for replacement or repairs without disturbing the worm gear driving connection to drum C, nor the braking apparatus for the latter. Thus the brake will continue to hold the load regardless of the rupture of the fluid pressure supply line or even of the removal of the hoist motor.

While the invention has been herein disclosed in what is considered to be a preferred form, it is to be understood that the invention is not limited to the specific details thereof, but covers all changes, modifications and adaptations within the scope of the appended claims.

I claim as my invention:

1. In hoisting apparatus having a drum, a shaft for operating said drum, braking means for said drum, and a control member for said braking means extending longitudinally of said shaft and substantially within a projection of the latter.

2. In hoisting appartus having a drum, a shaft for operating said drum, braking means for said drum, and a control member for said braking means extending axially through said shaft.

3. In hoisting apparatus having a drum, a shaft for operating said drum, braking means for said drum acting upon said shaft, said shaft having a bore axially therethrough and a control member for said braking means movable within said bore.

4. In hoisting apparatus having a drum, a shaft for operating said drum, braking means for said drum acting upon said shaft, said shaft having a bore axially therethrough, a control member for said braking means movable within said bore, and fluid pressure means for actuating said control member.

5. In hoisting apparatus having a drum, a shaft for operating said drum, braking means for said drum acting upon said shaft, said shaft having a bore axially therethrough, a control member for said braking means reciprocable within said bore, and fluid pressure means including a piston for moving said member in one direction.

6. The combination with a rotatable member having a worm and worm gear driving connection, a hollow shaft carrying said worm, spring loaded braking means acting upon said shaft, and means extending through said shaft for releasing said braking means.

7. The combination with a rotatable member having a worm and worm gear driving connection, a hollow shaft carrying said worm, spring loaded braking means of the multiple plate type acting upon said shaft, and means extending through said shaft for releasing said braking means.

8. The combination with a rotatable member having a worm and worm gear driving connection, a hollow shaft carrying said worm, friction braking means at one end of said shaft, a driving gear upon the other end of said shaft, a control rod extending axially through said gear, a shaft and braking means for controlling the latter, and a fluid pressure actuated piston adjacent said gear and in line with said shaft for actuating said rod.

9. The combination with a rotatable member having a worm and worm gear driving connection, a hollow shaft carrying said worm, friction braking means of the multiple plate type at one end of said shaft, a spring pressed member for yieldingly maintaining the plates of said braking means in tight engagement, driving means for said shaft on the opposite end thereof, a control rod extending axially through said driving means and said shaft for engagement with said spring pressed member, and fluid pressure operated means adjacent said shaft at the end remote from said braking means for actuating said rod.

10. In hoisting apparatus having a drum, a shaft for operating said drum, braking means for said drum acting upon said shaft, and means at the opposite ends of said shaft for operating and for releasing said braking means including a control member extending beyond said shaft at both end.

11. In hoisting apparatus having a drum, a hollow shaft, a worm and worm gear driving means between said drum and said shaft, friction braking means of the multiple plate type at one end of said shaft, a spring pressed member for yieldingly maintaining the plates of said braking means in tight engagement, a control rod extending axially through said shaft for engagement with said spring pressed member, and a fluid pressure operated piston in engagement with the opposite end of said rod.

Signed by me at Cleveland, in the county of Cuyahoga and State of Ohio, this 25th day of February, 1928.

LEON F. MEUNIER.